(No Model.)
W. WALKER.
Chains of Chain Fluting Machines.
No. 230,091. Patented July 13, 1880.
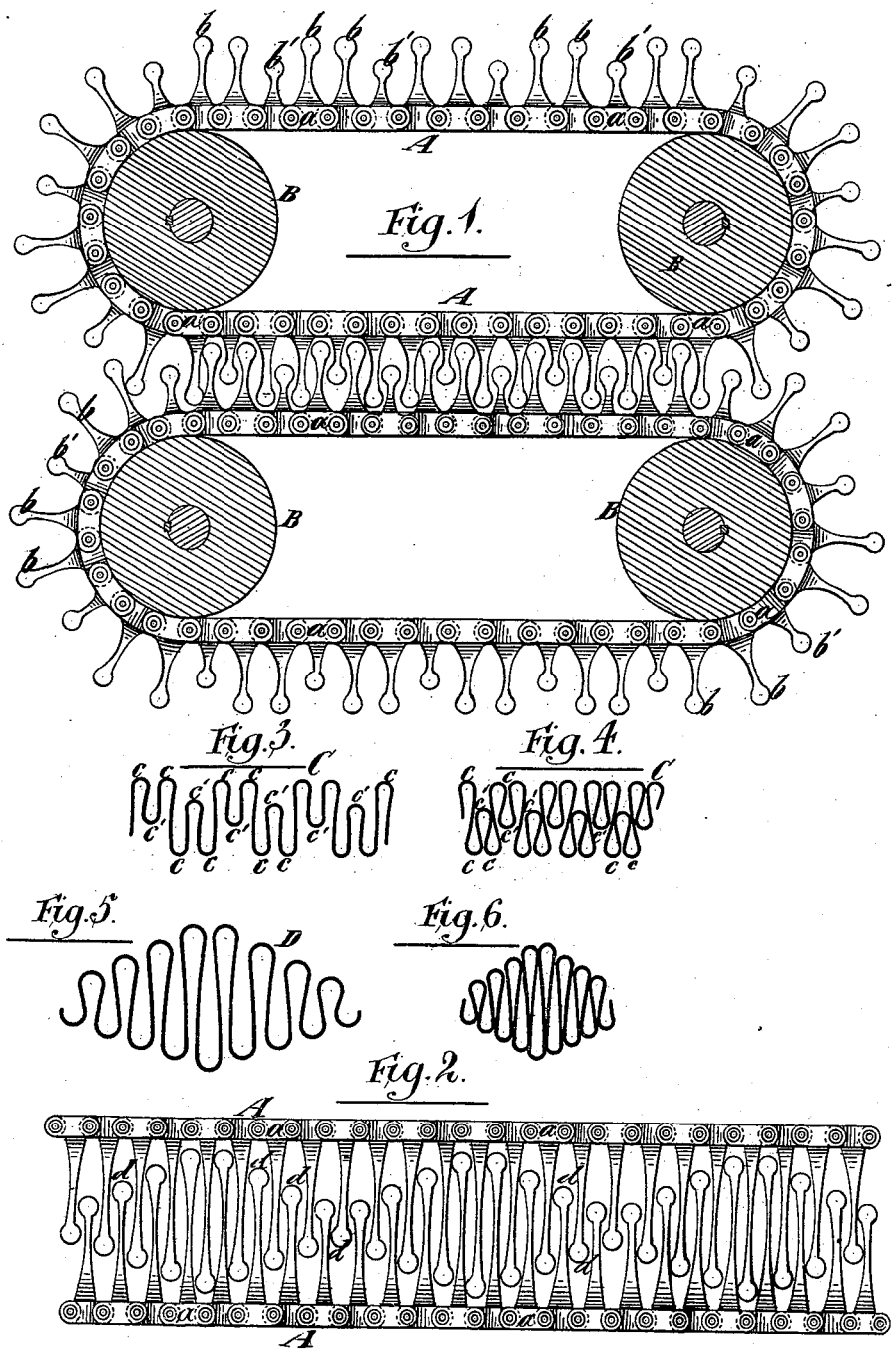
Witnesses:
Inventor:—

UNITED STATES PATENT OFFICE.

WILLIAM WALKER, OF BROOKLYN, ASSIGNOR TO EMIL S. LEVI, OF NEW YORK, N. Y.

CHAIN OF CHAIN FLUTING-MACHINES.

SPECIFICATION forming part of Letters Patent No. 230,091, dated July 13, 1880.

Application filed April 20, 1880. (No model.)

*To all whom it may concern:*

Be it known that I, WILLIAM WALKER, of the city of Brooklyn, in Kings county, and State of New York, have invented a certain new and useful Improvement in the Chains of Chain Fluting-Machines, of which the following is a specification.

In the chains which are commonly employed in chain ruffling or fluting machines the arms or horns which project from the links of the chain and intermesh to form the flutes, and which are provided with heads commonly known as "balls," are of uniform projection, and hence are only capable of producing a ruffle in which the flutes are all of uniform depth or projection.

The object of my invention is to provide for the manufacture of ruffles of a kind not heretofore produced by machinery, and which I believe to be quite new, their peculiarity consisting in their having flutes of varying depth or projection.

To this end my invention consists in a chain for a chain fluting-machine having the arms or horns of the links which carry the balls of different lengths, as more fully hereinafter described.

In the accompanying drawings, Figure 1 represents a side view of a pair of chains for a chain fluting-machine embodying my invention, together with their supporting rollers or drums. Fig. 2 represents a side view of a portion of a pair of chains of slightly-modified form. Fig. 3 represents a diagram view of a portion of a ruffle as it comes from the chains shown in Fig. 1. Fig. 4 represents a portion of such ruffle finished by what is called "reefing." Fig. 5 represents a similar diagram view of a ruffle as it comes from the chains shown in Fig. 2, and Fig. 6 represents a portion of such a ruffle reefed.

Similar letters of reference designate corresponding parts in all the figures.

Referring first to Fig. 1, A A designate two chains of a chain fluting-machine composed of the links $a$ and supported upon rollers or drums B, through certain of which motion is imparted to them. The said links of the chains are furnished with projecting horns, arms, or what are commonly known as "balls," $b\ b'$, those of each chain intermeshing with those of the other chain, and thereby forming the flutes of the ruffle. As is clearly shown in Fig. 1, certain of said horns or arms or balls, $b$, are of greater length than the others, $b'$, and in this example of my invention two of the long horns, arms, or balls $b$ are arranged in pairs between two short horns, arms, or balls, $b'$, one of said short ones being between each pair of long ones.

The shape of the flutes formed by this construction of chain is clearly shown in the ruffle C, Fig. 3, the flutes $c$ of which are formed by the long horns, arms, or balls, $b$, while the flutes $c'$ are formed by the short horns, arms, or balls, $b'$.

In the chains A A (shown in Fig. 2) the length of the horns, arms, or balls $d$ which project from the links $a$ is increased and diminished in regular progression, and the ruffle D formed thereby, as shown in Fig. 5, is not of uniform width, but has its flutes widened or increased in depth at certain points or portions, and gradually decreased in width in both directions from said wide points or portions.

After the ruffles are formed by the chains, as shown in Figs. 3 and 5, the flutes thereof are pressed into contact or reefed, as shown in Figs. 4 and 6, and while in that position are confined and steamed, so as to give them stiffness and cause them to retain their shape.

What I claim as my invention, and desire to secure by Letters Patent, is—

1. A chain for a chain fluting-machine, having the horns or arms of the links of the chain which carry the balls of different lengths, substantially as and for the purpose specified.

2. A chain for a chain fluting-machine, in which short and long horns or arms carrying the fluting-balls alternate with each other, substantially as herein described.

3. A chain for a chain fluting-machine, in which pairs of long arms or horns alternate with single short arms or horns, substantially as herein described with reference to Fig. 1 of the drawings.

WM. WALKER.

Witnesses:
E. P. JESSUP,
FREDK. HAYNES.